(12) United States Patent (10) Patent No.: US 12,689,036 B2
Minami (45) Date of Patent: Jul. 21, 2026

(54) IONIC CONDUCTOR, ALL-SOLID STATE BATTERY, AND METHOD OF PRODUCING IONIC CONDUCTOR

(71) Applicant: TOYOTA JIDOSHA KABUSHIKI KAISHA, Toyota (JP)

(72) Inventor: Keiichi Minami, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 689 days.

(21) Appl. No.: 18/135,883

(22) Filed: Apr. 18, 2023

(65) Prior Publication Data

US 2023/0402611 A1 Dec. 14, 2023

(30) Foreign Application Priority Data

Jun. 13, 2022 (JP) ................................. 2022-094978

(51) Int. Cl.
| *H01M 4/62* | (2006.01) |
| *C01B 35/14* | (2006.01) |
| *H01M 4/134* | (2010.01) |
| *H01M 10/0562* | (2010.01) |
| *H01M 4/02* | (2006.01) |

(52) U.S. Cl.
CPC ............. *H01M 4/628* (2013.01); *C01B 35/14* (2013.01); *H01M 4/134* (2013.01); *H01M 10/0562* (2013.01); *C01P 2002/72* (2013.01); *C01P 2006/40* (2013.01); *H01M 2004/027* (2013.01); *H01M 2300/008* (2013.01)

(58) Field of Classification Search
CPC .. H01M 4/628; H01M 4/134; H01M 10/0562; H01M 2004/027; H01M 2300/008; H01M 4/382; C01B 35/14; C01P 2002/72; C01P 2006/40; Y02E 60/10
See application file for complete search history.

(56) References Cited

U.S. PATENT DOCUMENTS

| 2017/0338512 A1 | 11/2017 | Nogami et al. |
| 2020/0091499 A1 | 3/2020 | Yoshima et al. |
| 2020/0099046 A1* | 3/2020 | Muldoon .............. H01M 4/525 |
| 2020/0227776 A1* | 7/2020 | Jordy ...................... C01B 6/246 |

FOREIGN PATENT DOCUMENTS

| JP | 2018-039689 | 3/2018 |
| JP | 2020-534245 | 11/2020 |
| WO | 2016/103894 | 6/2016 |

OTHER PUBLICATIONS

Tatsumisago, et al. Journal of Power Sources 244 (2013) 707-701 (Year: 2013).*
Yu et al. Small Methods 2021, 5, 2100609 (Year: 2021).*
López-Aranguren et al. Solid State Ionics 339 (2019) 114987 (Year: 2019).*

(Continued)

*Primary Examiner* — Lisa S Park
(74) *Attorney, Agent, or Firm* — Dinsmore & Shohl LLP

(57) ABSTRACT

The present disclosure provides an ionic conductor containing Li, P, S, $BH_4$, and I, and includes a crystalline phase X having peaks at a position of $2\theta=29.1°\pm0.5°$ and $30.4°\pm0.5°$ in XRD measurement using a $CuK\alpha$ ray.

10 Claims, 3 Drawing Sheets

(56) References Cited

OTHER PUBLICATIONS

Anh Ha Dao et al., "Improvement of the ionic conductivity on new substituted borohydride argyrodites", Solid State Ionics, North Holland Publishing Company, Amsterdam, NL, vol. 339, Jun. 21, 2019.

Tengfei Zhang et al., "Fast Lithium Ionic Conductivity in Complex Hydride-Sulfide Electrolytes by Double Anions Substitution", Small Methods, vol. 5, No. 8, Jul. 9, 2021, DOI: 10.1002/smtd.202100609, pp. 1-9.

* cited by examiner

IONIC CONDUCTOR, ALL-SOLID STATE BATTERY, AND METHOD OF PRODUCING IONIC CONDUCTOR

CROSS-REFERENCE TO RELATED APPLICATION

This application claims priority to Japanese Patent Application No. 2022-094978 filed on Jun. 13, 2022, incorporated herein by reference in its entirety.

BACKGROUND

1. Technical Field

The disclosure relates to an ionic conductor, an all-solid state battery, and a production method for an ionic conductor.

2. Description of Related Art

An all-solid state battery is a battery that has a solid electrolyte layer between a positive electrode layer and a negative electrode layer, and as compared with a liquid-based battery that has an electrolyte containing a flammable organic solvent, an advantage is that simplifying a safety device is easy. A solid ionic conductor is used in the all-solid state battery.

WO 2016-103894 discloses an ionic conductor containing lithium (Li), borohydride ($BH_4^-$), phosphorus (P), and sulfur (S) and having a diffraction peak at a predetermined position in X-ray diffraction. Further, Japanese Unexamined Patent Application Publication No. 2020-534245 (JP 2020-534245 A) discloses a compound represented by $Li_{7-x}PS_{6-x}X_{x-z}(BH_4)_z$ (wherein X is selected from the group consisting of Cl, Br, I, F, and CN, and $0<x\leq2$, and $0<z\leq0.50$). Further, Japanese Unexamined Patent Application Publication No. 2018-039689 (JP 2018-039689 A) discloses a production method for an ionic conductor, the production method including the step of mixing a raw material containing $LiBH_4$ and $P_2S_5$ in a predetermined ratio with a solvent and obtaining a mixture and the step of removing the solvent from the mixture.

SUMMARY

For example, a $LiBH_4$—$P_2S_5$ system ionic conductor has good ionic conductivity. On the other hand, the $LiBH_4$—$P_2S_5$ system ionic conductor tends to have low resistance to reduction.

The present disclosure provides an ionic conductor with good resistance to reduction.

According to a first aspect of the disclosure, an ionic conductor contains Li, P, S, $BH_4$, and I, and has a crystalline phase X having peaks at a position of $2\theta=29.1°\pm0.5°$ and $30.4°\pm0.5°$ in XRD measurement using a CuKα ray.

In the first aspect of the disclosure, when an intensity of the peak at $2\theta=29.1°\pm0.5°$ is denoted by $I_A$ and an intensity of the peak at $2\theta=30.4°\pm0.5°$ is denoted by a ratio of $I_B$ to $I_A$ ($I_B/I_A$) may be 35% or more.

In the first aspect of the disclosure, $I_B/I_A$ may be 60% or more.

In the first aspect of the disclosure, the ionic conductor may have a composition represented by $(100-\alpha)\{(1-\beta)LiBH_4-\beta P_2S_5\}-\alpha LiI$, α may satisfy $0<\alpha\leq20$, and β may satisfy $0.01<\beta\leq0.3$.

In the first aspect of the disclosure, the ionic conductor may be $95(0.9LiBH_4-0.1-P_2S_5)-5LiI$.

According to a second aspect of the disclosure, an all-solid state battery includes a positive electrode layer, a negative electrode layer, and a solid electrolyte layer provided between the positive electrode layer and the negative electrode layer. At least one of the positive electrode layer, the negative electrode layer, and the solid electrolyte layer contains the ionic conductor.

In the second aspect of the disclosure, the negative electrode layer may contain the ionic conductor.

In the second aspect of the disclosure, the negative electrode layer may contain a Li elemental substance or a Li alloy.

According to a third aspect of the disclosure, a production method for an ionic conductor includes preparing an intermediate containing Li, P, S, and $BH_4$, adding an I source to the intermediate to obtain a precursor, and calcinating the precursor to obtain an ionic conductor having a crystalline phase X having peaks at a position of $2\theta=29.1°\pm0.5°$ and $30.4°\pm0.5°$ in XRD measurement using a CuKα ray.

In the third aspect of the disclosure, the I source may be LiI.

In the third aspect of the disclosure, the precursor may be obtained by amorphizing a mixture containing the intermediate and the I source.

The ionic conductor in the present disclosure has the effect of having good resistance to reduction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
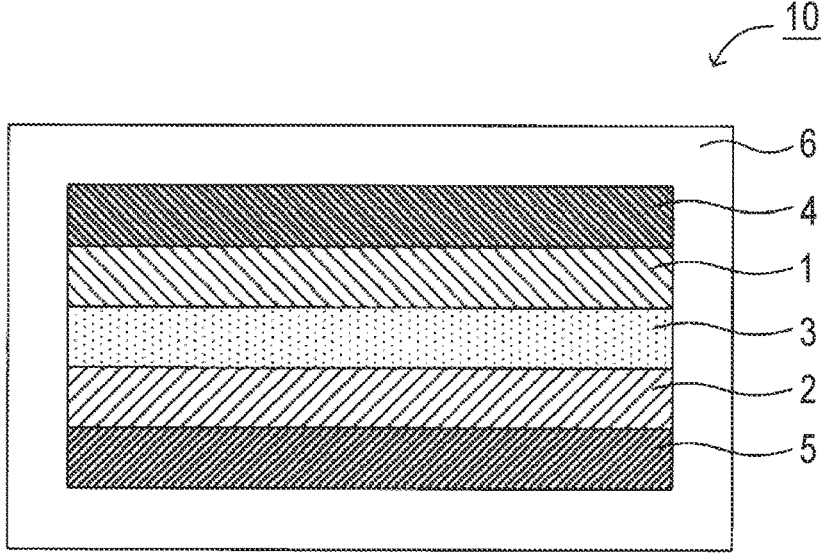
FIG. 1 is a schematic cross-sectional view illustrating an all-solid state battery in the present disclosure.

An ionic conductor, an all-solid state battery, and a production method for an ionic conductor in the present disclosure will be described in detail below.

A. Ionic Conductor

The ionic conductor in the present disclosure contains Li, P, S, $BH_4$, and I, and has a crystalline phase X having peaks at a position of $2\theta=29.1°\pm0.5°$ and $30.4°\pm0.5°$ in XRD measurement using a CuKα ray.

According to the present disclosure, since a predetermined element including I is contained, an ionic conductor having good resistance to reduction is obtained. As described above, an ionic conductor of a $LiBH_4$—$P_2S_5$ system has good ionic conductivity. It is because the crystalline phase X, which will be described later, is included. On the other hand, the ionic conductor of the $LiBH_4$—$P_2S_5$ system has low resistance to reduction. Presumption may be made that it is due to the low $BH_4$ anion resistance to reduction. In the present disclosure, by replacing a portion of $LiBH_4$ with, for example, LiI, an ionic conductor having good resistance to reduction can be obtained. Since the ionic conductor in the present disclosure has good resistance to reduction, the ionic conductor is particularly useful as a material for the negative electrode layer. Further, when a portion of $LiBH_4$ is replaced with, for example, LiI, a structure of the crystalline phase X is likely to collapse, but by using LiI after preparing an intermediate, an ionic conductor having good resistance to reduction can be obtained while the collapse of the structure of the crystalline phase X is suppressed.

The ionic conductor in the present disclosure contains Li, P, S, $BH_4$, and I. Further, the ionic conductor is typically an ionic conductor of a $LiBH_4$—$P_2S_5$—LiI system. The ionic conductor desirably has a composition represented by $(100-\alpha)\{(1-\beta)LiBH_4-\beta P_2S_5\}-\alpha LiI$. $\alpha$ usually may satisfy $0<\alpha$, may satisfy $1\leq\alpha$, or may satisfy $5\leq\alpha$. On the other hand, $\alpha$ may satisfy, for example, $\alpha\leq20$, may satisfy $\alpha\leq15$, or may satisfy $\alpha\leq10$. $\beta$ may usually satisfy $0.01<\beta$, may satisfy $0.03\leq\beta$, or may satisfy $0.05\leq\beta$. On the other hand, $\beta$ may satisfy, for example, $\beta\leq0.3$, may satisfy $\beta\leq0.25$, or may satisfy $\beta\leq0.15$.

Further, the ionic conductor in the present disclosure includes a specific crystalline phase X. The crystalline phase X is presumed to be an argyrodite-kind crystalline phase. The crystalline phase X usually has peaks at a position of $2\theta=29.1°\pm0.5°$ and $30.4°\pm0.5°$ in X-ray diffraction (XRD) measurement using a $CuK\alpha$ ray. The crystalline phase X may further have peaks at a position of $2\theta=14.4°\pm0.5°$, $15.0°\pm0.5°$, $24.9°+0.5°$, $51.1°\pm0.5°$, and $53.5°\pm0.5°$. Each of the positions of the peaks may be in a range of $\pm0.3°$ or may be in a range of $\pm0.1°$.

Further, an intensity of the peak at $2\theta=29.1°\pm0.5°$ is denoted as $I_A$, and an intensity of the peak at $2\theta=30.4°\pm0.5°$ is denoted as $I_B$. A ratio of $I_B$ to $I_A$ ($I_B/I_A$) may be, for example, 35% or more, may be 50% or more, or may be 60% or more. On the other hand, $I_B/I_A$ is usually 100% or less.

The ionic conductor in the present disclosure desirably contains the crystalline phase X as a main phase. The "main phase" refers to a crystalline phase to which the peak with the highest intensity belongs in the XRD measurement using a $CuK\alpha$ ray. Further, in the XRD measurement using a $CuK\alpha$ ray for the ionic conductor, a peak of LiI may be observed or may not be observed.

The ionic conductor in the present disclosure desirably has high ionic conductivity. The ionic conductivity at 25° C. may be, for example, $0.5\times10^{-3}$ S/cm or more, may be $1\times10^{-3}$ S/cm or more, and may be $2\times10^{-3}$ S/cm or more.

The shape of the ionic conductor may be, for example, a particulate shape. Further, an average particle diameter ($D_{50}$) of the ionic conductor is, for example, 0.1 μm or more and 50 μm or less. The average particle diameter ($D_{50}$) can be obtained from the result of particle size distribution measurement by a laser diffraction scattering method. Applications of the ionic conductor are not particularly limited, but for example, are desirably used in the all-solid state battery.

B. All-Solid State Battery

FIG. 1 is a schematic cross-sectional view illustrating an all-solid state battery in the present disclosure. An all-solid state battery 10 shown in FIG. 1 has a positive electrode layer 1 containing a positive electrode active material, a negative electrode layer 2 containing a negative electrode active material, a solid electrolyte layer 3 provided between the positive electrode layer 1 and the negative electrode layer 2, a positive electrode current collector 4 that collects current from the positive electrode layer 1, a negative electrode current collector 5 that collects current from the negative electrode layer 2, and a battery case 6 that accommodates the members. Furthermore, at least one of the positive electrode layer 1, the negative electrode layer 2, and the solid electrolyte layer 3 contains the ionic conductor described in the "A. Ionic Conductor".

According to the present disclosure, by using the ionic conductor described above, the all-solid state battery having good resistance to reduction can be obtained.

1. Positive Electrode Layer

The positive electrode layer in the present disclosure is a layer containing at least a positive electrode active material. The positive electrode layer may contain at least one of an ionic conductor (solid electrolyte), a conductive material, and a binder in addition to the positive electrode active material.

Examples of the positive electrode active materials include oxide active materials. Specific examples of the oxide active materials include rock salt layered-kind active materials, such as $LiCoO_2$, $LiMnO_2$, $LiNiO_2$, $LiVO_2$, and $LiNi_{1/3}Co_{1/3}Mn_{1/3}O_2$, spinel-kind active materials, such as $LiMn_2O_4$ and $Li(Ni_{0.5}Mn_{1.5})O_4$, and olivine-kind active materials, such as $LiFePO_4$, $LiMnPO_4$, $LiNiPO_4$, and $LiCoPO_4$.

The surface of the positive electrode active material may be covered with a coat layer. It is because the reaction between the positive electrode active material and the solid electrolyte can be suppressed. Examples of materials for the coat layer include Li ion conductive oxides, such as $LiNbO_3$, $Li_3PO_4$, and LiPON. The average thickness of the coat layer may be, for example, 1 nm or more and 50 nm or less, and may be 1 nm or more and nm or less.

The positive electrode layer in the present disclosure desirably contains the ionic conductor described above. Further, examples of conductive materials include carbon materials. Examples of the carbon materials include particulate carbon materials, such as acetylene black (AB) and ketjen black (KB), and fibrous carbon materials, such as carbon fibers, carbon nanotubes (CNT), and carbon nanofibers (CNF). Examples of binders include fluorine-based binders, such as polyvinylidene fluoride (PVDF). The thickness of the positive electrode layer is, for example, 0.1 μm or more and 1,000 μm or less.

2. Negative Electrode Layer

The negative electrode layer in the present disclosure is a layer containing at least a negative electrode active material. Further, the negative electrode layer may contain at least one of an ionic conductor (solid electrolyte), a conductive material, and a binder in addition to the negative electrode active material.

Examples of the negative electrode active materials include metal active materials and carbon active materials. Examples of the metal active materials include Li, In, Al, Si, and Sn. The negative electrode active material is desirably a Li elemental substance or a Li alloy. Since a Li elemental substance or a Li alloy has a low reaction potential, an all-solid state battery with high voltage can be obtained. Further, since the ionic conductor in the present disclosure has good resistance to reduction, reductive decomposition is less likely to occur although the ionic conductor is used together with a Li elemental substance or a Li alloy. The all-solid state battery may be a battery utilizing dissolution and deposition of Li as a negative electrode reaction. In the case, the all-solid state battery may not have a negative electrode layer in a state before initial charge or in a state after complete discharge. On the other hand, examples of carbon active materials include mesocarbon microbeads (MCMB), highly oriented pyrolytic graphite (HOPG), hard carbon, and soft carbon.

The ionic conductor, the conductive material, and the binder are the same as described above. The negative electrode layer in the present disclosure desirably contains the ionic conductor described above. The thickness of the negative electrode layer is, for example, 0.1 µm or more and 1,000 µm or less.

3. Solid Electrolyte Layer

The solid electrolyte layer in the present disclosure is a layer containing at least a solid electrolyte. Further, the solid electrolyte layer may contain a binder in addition to the solid electrolyte. The solid electrolyte layer in the present disclosure may contain the ionic conductor described above as a solid electrolyte. Further, the binder is the same as described above. The thickness of the solid electrolyte layer is, for example, 0.1 µm or more and 1,000 µm or less.

4. Other Configurations

The all-solid state battery in the present disclosure usually has a positive electrode current collector that collects current of the positive electrode active material and a negative electrode current collector that collects current of the negative electrode active material. Examples of materials for the positive electrode current collector include SUS, aluminum, nickel, iron, titanium, and carbon. On the other hand, examples of materials for the negative electrode current collector include SUS, copper, nickel, and carbon. Further, a general battery case, such as a SUS battery case can be used as the battery case.

5. All-Solid State Battery

The all-solid state battery in the present disclosure is desirably an all-solid lithium ion battery. Further, the all-solid state battery may be a primary battery or a secondary battery, but the secondary battery is desirable. It is because the all-solid state battery can be repeatedly charged and discharged and is useful, for example, as a battery for a vehicle. The secondary battery also includes the use of a secondary battery as a primary battery (the use for the purpose of discharging merely once after charging). Further, examples of a shape of the all-solid state battery include a coin kind, a laminate kind, a cylindrical kind, and a rectangular kind.

C. Method of Producing Ionic Conductor

Figure 2:
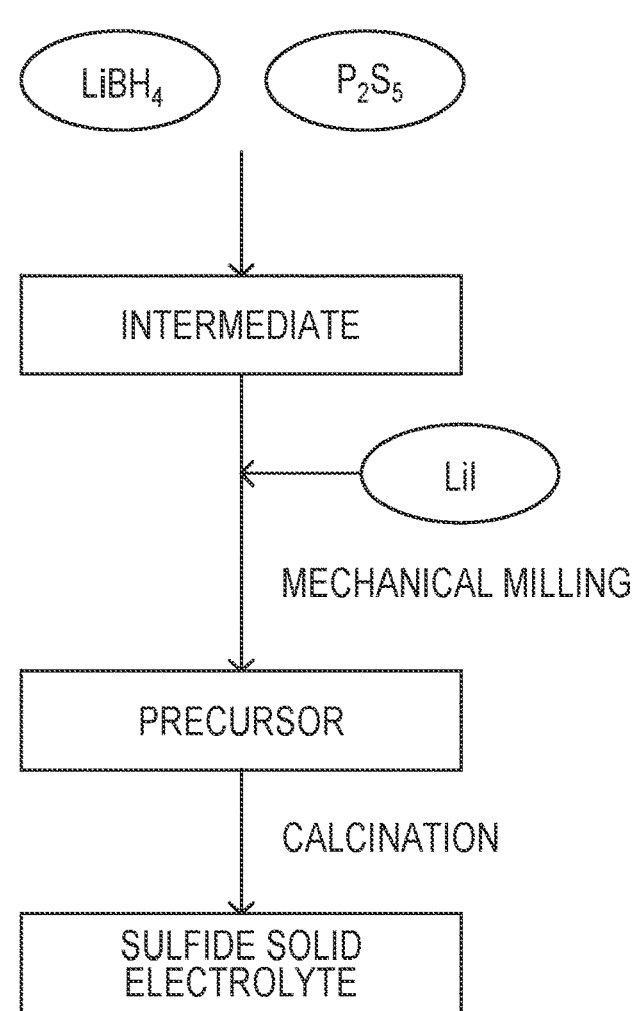
FIG. 2 is a flowchart illustrating a production method for an ionic conductor in the present disclosure.
Figure 3:
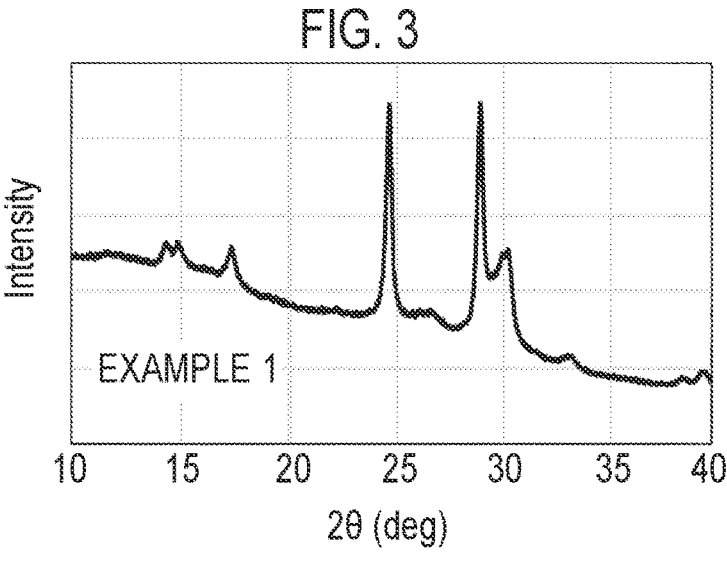
FIG. 3 is a result of XRD measurement for an ionic conductor obtained in Example 1.
Figure 4:
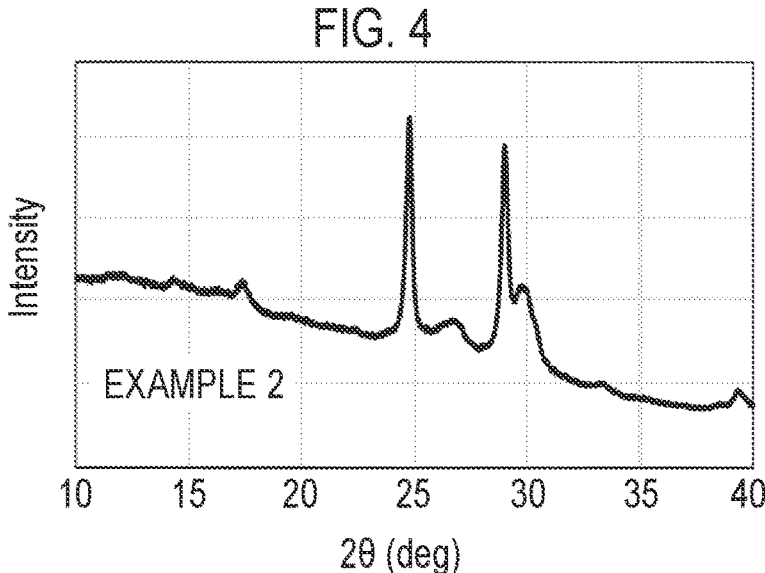
FIG. 4 is a result of the XRD measurement for an ionic conductor obtained in Example 2.
Figure 5:
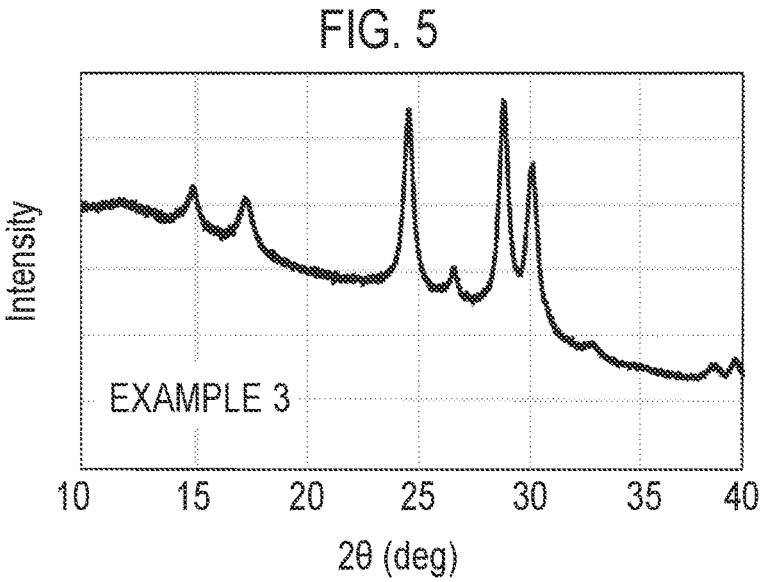
FIG. 5 is a result of the XRD measurement for an ionic conductor obtained in Example 3.
Figure 6:
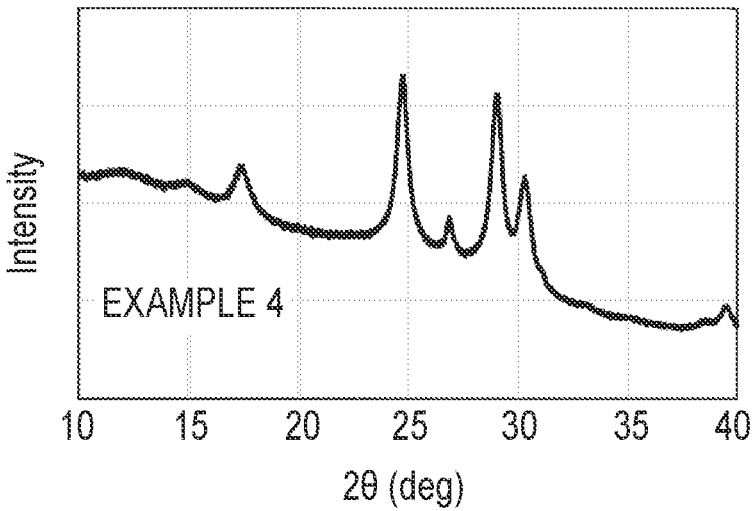
FIG. 6 is a result of the XRD measurement for an ionic conductor obtained in Example 4.
Figure 7:
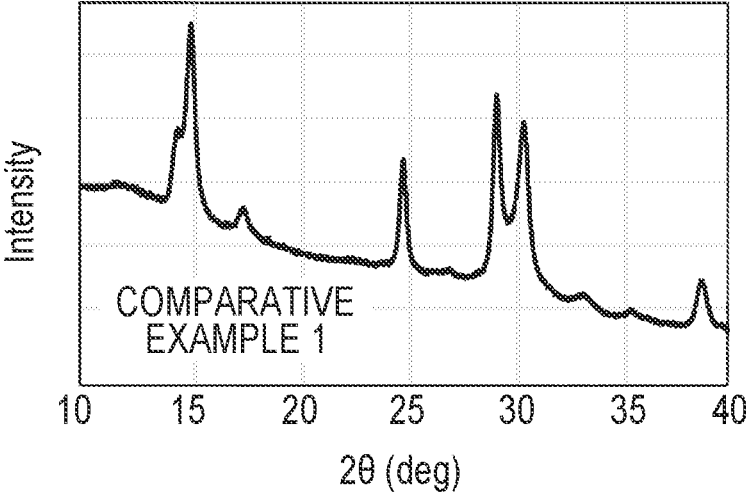
FIG. 7 is a result of the XRD measurement for an ionic conductor obtained in Comparative Example 1.

FIG. 2 is a flowchart illustrating a production method for the ionic conductor in the present disclosure. In FIG. 2, a mixture containing $LiBH_4$ and $P_2S_5$ is amorphized and then calcined to prepare an intermediate (preparation step). Next, a precursor is obtained by adding the I source (LiI) to the intermediate and amorphizing the mixture (addition step). Next, an ionic conductor can be obtained by calcinating a precursor (calcination step).

According to the present disclosure, by using the I source after preparing the intermediate, an ionic conductor with better resistance to reduction can be obtained. Here, when a portion of $LiBH_4$ is replaced with the I source (for example, LiI), the structure of the crystalline phase X tends to collapse. On the other hand, by performing synthesis using the I source after preparing an intermediate, an ionic conductor having better resistance to reduction can be obtained while the collapse of the structure of the crystalline phase X is suppressed.

1. Preparation Step

The preparation step in the present disclosure is the step of preparing an intermediate containing Li, P, S, and $BH_4$. The intermediate may be prepared by oneself or purchased from others.

An example of a method of preparing the intermediate includes a method of amorphizing a mixture containing a Li source, a P source, a S source, and a $BH_4$ source and then performing calcination. Examples of the Li source include Li sulfides. Examples of the Li sulfide include $Li_2S$. Examples of the P source include P sulfides. Examples of the P sulfide include $GeS_2$. Examples of the S source include elemental sulfur and various sulfides described above. The $BH_4$ source includes Li salts ($LiBH_4$). Further, a composition of the mixture is desirably adjusted appropriately according to the composition of the desired ionic conductor.

Examples of the method of amorphizing the mixture include mechanical milling methods, such as ball mills and vibration mills. The mechanical milling method may be dry or may be wet, but the latter is desired from a viewpoint of uniform treatment. A kind of dispersion medium used in the wet mechanical milling method is not particularly limited.

Various conditions of mechanical milling are set to obtain a desired intermediate. For example, when a planetary ball mill is used, a raw material composition and grinding balls are added and processed at a predetermined rotation speed and time. The rotation speed of the bed of the planetary ball mill may be, for example, 150 rpm or more, and may be 250 rpm or more. On the other hand, the rotation speed of the bed of the planetary ball mill may be, for example, 400 rpm or less, and may be 350 rpm or less. Further, the processing time of the planetary ball mill may be, for example, 30 minutes or longer, and may be 1 hour or longer. On the other hand, the processing time of the planetary ball mill may be, for example, 30 hours or less, and may be 25 hours or less.

An intermediate can be obtained by calcinating the amorphous mixture. A calcination temperature may be, for example, 150° C. or higher, and may be 180° C. or higher. On the other hand, the calcination temperature is, for example, 300° C. or lower. Further, a calcination time may be, for example, 1 hour or more, and may be 2 hours or more. On the other hand, the calcination time is, for example, 10 hours or less, and may be 5 hours or less. A calcination atmosphere includes, for example, inert gas atmosphere and vacuum.

Further, another example of the method of preparing an intermediate includes a method of calcinating a mixture containing the Li source, the P source, the S source, and the $BH_4$ source (so-called solid-phase method).

The intermediate contains at least Li, P, S, and $BH_4$. Further, since the I source is added to an intermediate in the addition step described later, the intermediate does not need to contain I. That is, the intermediate may not contain I. Alternatively, a portion of the I source may be contained in the intermediate beforehand. In the case the intermediate contains I. The ratio of I contained in the intermediate to I contained in the ionic conductor may usually be 50 mol % or less, may be 30 mol % or less, or may be 10 mol %.

The intermediate desirably has the crystalline phase X having peaks at a position of $2\theta=29.1°±0.5°$ and $30.4°±0.5°$ in the XRD measurement using a CuKα ray. The crystalline phase X is the same as described in the "A. Ionic Conductor", such that the description is omitted here.

2. Addition Step

The addition step in the present disclosure is the step of adding the I source to the intermediate to obtain a precursor. Examples of the I source include Li salts (LiI). The precursor may be a mixture containing an intermediate and the I source. The mixture can be obtained by mixing the intermediate and the I source. On the other hand, the precursor may be an amorphous body containing the intermediate and the I source. The amorphous body can be obtained by amorphizing a mixture containing the intermediate and the I source.

Examples of the method of amorphizing the mixture include mechanical milling methods, such as ball mills and vibration mills. The mechanical milling method may be dry or may be wet, but the latter is desired from a viewpoint of uniform treatment. A kind of dispersion medium used in the wet mechanical milling method is not particularly limited.

Various conditions of mechanical milling are set to obtain a desired precursor. For example, when a planetary ball mill is used, a raw material composition and grinding balls are added and processed at a predetermined rotation speed and time. The rotation speed of the bed of the planetary ball mill may be, for example, 150 rpm or more, and may be 250 rpm or more. On the other hand, the rotation speed of the bed of the planetary ball mill may be, for example, 400 rpm or less, and may be 350 rpm or less. Further, the processing time of the planetary ball mill may be, for example, 30 minutes or longer, and may be 1 hour or longer. On the other hand, the processing time of the planetary ball mill may be, for example, 30 hours or less, and may be 25 hours or less.

The precursor may have the crystalline phase X having peaks at a position of $2\theta=29.1°\pm0.5°$ and $30.4°\pm0.5°$ in the XRD measurement using a CuKα ray, and may not have. Further, in the XRD measurement using a CuKα ray of the precursor, a peak derived from the I source may be observed or may not be observed.

3. Calcination Step

The calcination step in the present disclosure is the step of calcinating the precursor to obtain an ionic conductor having the crystalline phase X having peaks at a position of $2\theta=29.1°\pm0.5°$ and $30.4°\pm0.5°$ in the XRD measurement using a CuKα ray. A calcination temperature may be, for example, 150° C. or higher, and may be 180° C. or higher. On the other hand, the calcination temperature is, for example, 300° C. or lower. Further, a calcination time may be, for example, 1 hour or more, and may be 2 hours or more. On the other hand, the calcination time is, for example, 10 hours or less, and may be 5 hours or less. A calcination atmosphere includes, for example, inert gas atmosphere and vacuum.

4. Ionic Conductor

The ionic conductor obtained by each step described above is the same as described in the "A. Ionic Conductor".

The present disclosure is not limited to the embodiment. The embodiment is an example and anything that has substantially the same configuration as the technical idea described in the claims of the present disclosure and produces the same effect is included in the technical scope of the present disclosure.

Example 1

LiBH$_4$ (manufactured by Aldrich, 0.8022 g), P$_2$S$_5$ (manufactured by Aldrich, 0.9096 g), and LiI (manufactured by Japan Pure Chemical, 0.2882 g) were weighed. The materials were placed in a 500 ml ZrO$_2$ pot, and φ5 mm ZrO$_2$ balls (450 g) and heptane (100 g) were further placed and sealed. The sealed container was set in a ball mill apparatus (P-manufactured by Fritsch). A precursor was obtained by performing 20 sets of mixing at a rotation speed of 300 rpm for 1 hour and then resting for 10 minutes. The obtained precursor was calcinated in a condition at 200° C. using a hot plate to obtain an ionic conductor. The composition of the obtained ionic conductor was 95(0.9LiBH$_4$-0.1P$_2$S$_5$)-5LiI.

Example 2

An ionic conductor was obtained in the same manner as in Example 1, and a mere difference is that the usage amount of each raw material was changed to LiBH$_4$ (0.6915 g), P$_2$S$_5$ (0.7840 g), and LiI (0.5245 g). The composition of the obtained ionic conductor was 90(0.9LiBH$_4$-0.1P$_2$S$_5$)-10LiI.

Example 3

LiBH$_4$ (4.0111 g) and P$_2$S$_5$ (4.5478 g) were weighed. The materials were placed in a 500 ml ZrO$_2$ pot, and φ5 mm ZrO$_2$ balls (450 g) and heptane (100 g) were further placed and sealed. The sealed container was set in a ball mill apparatus (P-5 manufactured by Fritsch). An intermediate was obtained by performing 20 sets of mixing for 1 hour at a rotation speed of 300 rpm and then resting for 10 minutes. The obtained intermediate (1.7118 g) and LiI (0.2882 g) were placed in a 45 ml ZrO$_2$ pot, and φ5 mm ZrO$_2$ balls (53 g) and heptane (4 g) were further placed and sealed. The sealed container was set in a ball mill apparatus (P-5 manufactured by Fritsch). A precursor was obtained by performing 10 sets of mixing at a rotation speed of 300 rpm for 1 hour and then resting for 10 minutes. The obtained precursor was calcinated in a condition at 200° C. using a hot plate to obtain an ionic conductor. The composition of the obtained ionic conductor was 95(0.9LiBH$_4$-0.1P$_2$S$_5$)-5LiI.

Example 4

An ionic conductor was obtained in the same manner as in Example 3, and a mere difference is that the usage amount of the intermediate was changed to 1.4755 g and the usage amount of LiI was changed to 0.5245 g. The composition of the obtained ionic conductor was 90(0.9LiBH$_4$-0.1P$_2$S$_5$)-10LiI.

Comparative Example 1

The ionic conductor was obtained in the same manner as in Example 1, and a mere difference is that LiI was not used and the usage amount of each raw material was changed to LiBH$_4$ (4.6865 g) and P$_2$S$_5$ (5.3135 g). The composition of the obtained ionic conductor was 90LiBH$_4$-10P$_2$S$_5$.

Evaluation

XRD Measurement

The ionic conductors obtained in Examples 1 to 4 and Comparative Example 1 were subjected to the X-ray diffraction (XRD) measurement using a CuKα ray. The results are shown in FIGS. 3 to 7, respectively. As shown in FIGS. 3 to 7, confirmation was made that the ionic conductors obtained in Examples 1 to 4 and Comparative Example 1 have the crystalline phase X having peaks in the vicinity of $2\theta=29.1°$ and in the vicinity of $2\theta=30.4°$. Table 1 shows the intensity ratio ($I_B/I_A$) between the peak intensity $I_A$ in the vicinity of $2\theta=29.1°$ and the peak intensity $I_B$ in the vicinity of $2\theta=30.4°$. A straight line connecting a diffraction intensity at $2\theta=23°$ and the diffraction intensity at $2\theta=35°$ was used as a baseline for the intensity ratio.

Ionic Conductivity Measurement

The ionic conductors obtained in Examples 1 to 4 and Comparative Example 1 were subjected to ionic conductivity measurement (25° C.). Specifically, 100 mg of the obtained ionic conductor powder was sandwiched between two current collectors, placed in a ceramic cylinder, and pressed at a pressure of 6 tons/cm$^2$ to prepare a powder cell. An alternating current impedance method was performed on the prepared powder cell at room temperature, and the ionic conductivity was obtained from the resistance value and the thickness of the powder cell. Table 1 shows the result.

Li Dissolution and Deposition Test

The ionic conductors obtained in Examples 1 to 4 and Comparative Example 1 were subjected to a Li deposition and dissolution test. Specifically, 100 mg of the obtained ionic conductor powder was placed in a ceramic cylinder and pressed at a pressure of 6 tons/cm$^2$ to prepare a powder compact. Li metal foils were disposed on both sides of the powder compact to prepare an evaluation cell. A current of 0.1 mA was passed through the evaluation cell at room temperature for 1 hour. Subsequently, a current of –0.1 mA (reversal current) was passed through the evaluation cell at room temperature for 1 hour. The operations were repeated for a total of 100 hours. The potentials during deposition and dissolution at the time were compared at the initial period and after 100 hours, and the retention rate was obtained. Table 1 shows the result.

TABLE 1

| | Composition | LiI Addition | $I_B/I_A$ (%) | Potential Retention Rate (%) | Ionic Conductivity (mS/cm) |
|---|---|---|---|---|---|
| Example 1 | $95(0.9\text{LiBH}_4\text{—}0.1\text{P}_2\text{S}_5)\text{—}5\text{LiI}$ | Added in advance | 40.7 | 87.5 | 1.2 |
| Example 2 | $90(0.9\text{LiBH}_4\text{—}0.1\text{P}_2\text{S}_5)\text{—}10\text{LiI}$ | Added in advance | 35.4 | — | 1.0 |
| Example 3 | $95(0.9\text{LiBH}_4\text{—}0.1\text{P}_2\text{S}_5)\text{—}5\text{LiI}$ | Added later | 73.5 | 92.0 | 2.1 |
| Example 4 | $90(0.9\text{LiBH}_4\text{—}0.1\text{P}_2\text{S}_5)\text{—}10\text{LiI}$ | Added later | 60.8 | — | 1.7 |
| Comparative Example 1 | $90\text{LiBH}_4\text{—}10\text{P}_2\text{S}_5$ | No | 88.1 | 37.2 | 2.7 |

As shown in Table 1, confirmation is made that in Examples 1 to 4, as compared with Comparative Example 1, the ionic conductivity is lower, but the potential retention rate is higher. That is, confirmation is made that the ionic conductors obtained in Examples 1 to 4 have good resistance to reduction. In particular, Examples 3 and 4 have better ionic conductivity than Examples 1 and 2. Presumption may be made that it is because the subsequent addition of LiI suppressed the collapse of the structure of the crystalline phase X.

What is claimed is:

1. An ionic conductor comprising:

Li;

P;

S;

$BH_4$; and

I, wherein a crystalline phase X having peaks at a position of $2\theta=29.1°\pm0.5°$ and $30.4°\pm0.5°$ in XRD measurement using a CuKα ray is included, wherein the ionic conductor has a composition represented by $(100-\alpha)\{(1-\beta)\text{LiBH}_4\text{-}\beta\text{P}_2\text{S}_5\}\text{-}\alpha\text{LiI}$, and wherein α satisfies $0<\alpha\leq20$, and β satisfies $0.01<\beta\leq0.3$.

2. The ionic conductor according to claim 1, wherein when an intensity of the peak at $2\theta=29.1°\pm0.5°$ is denoted by IA and an intensity of the peak at $2\theta=30.4°\pm0.5°$ is denoted by $I_B$, a ratio of $I_B$ to $I_A$ $(I_B/I_A)$ is 35% or more.

3. The ionic conductor according to claim 2, wherein $I_B/I_A$ is 60% or more.

4. The ionic conductor according to claim 1, wherein the ionic conductor is $95$ $(0.9\text{LiBH}_4\text{-}0.1\text{P}_2\text{S}_5)\text{-}5\text{LiI}$.

5. An all-solid state battery comprising:

a positive electrode layer;

a negative electrode layer; and a solid electrolyte layer provided between the positive electrode layer and the negative electrode layer, wherein at least one of the positive electrode layer, the negative electrode layer, and the solid electrolyte layer contains the ionic conductor according to claim 1.

6. The all-solid state battery according to claim 5, wherein the negative electrode layer contains the ionic conductor.

7. The all-solid state battery according to claim 6, wherein the negative electrode layer contains a Li elemental substance or a Li alloy.

8. A production method for an ionic conductor, the production method comprising:

preparing an intermediate containing Li, P, S, and $BH_4$;

adding an I source to the intermediate to obtain a precursor; and calcinating the precursor to obtain an ionic conductor having a crystalline phase X having peaks at a position of $2\theta=29.1°\pm0.5°$ and $30.4°\pm0.5°$ in XRD measurement using a CuKα ray.

9. The production method according to claim 8, wherein the I source is LiI.

10. The production method according to claim 8, wherein the precursor is obtained by amorphizing a mixture containing the intermediate and the I source.

* * * * *